United States Patent [19]
Kulterman

[11] 3,898,635
[45] Aug. 5, 1975

[54] POSITION MEASURING TRANSFORMER

[75] Inventor: Robert Wayne Kulterman, Boca Raton, Fla.

[73] Assignee: International Business Machines Corporation, Armonk, N.Y.

[22] Filed: Dec. 20, 1973

[21] Appl. No.: 426,837

[52] U.S. Cl. .................. 340/196; 323/53; 336/129; 340/206; 340/211
[51] Int. Cl.² ........................................ H01R 33/04
[58] Field of Search ........... 340/178, 195, 196, 211; 323/51; 331/18

[56] References Cited
UNITED STATES PATENTS

| | | | |
|---|---|---|---|
| 2,767,365 | 10/1956 | Guggi | 318/327 |
| 3,183,496 | 5/1965 | Goldstein | 340/196 |
| 3,356,933 | 12/1967 | Stettler | 323/51 |
| 3,480,937 | 11/1969 | Robinson | 340/196 |
| 3,683,343 | 8/1972 | Feldman et al. | 340/178 |
| 3,812,481 | 5/1974 | Stedtnitz | 340/196 |

*Primary Examiner*—Thomas B. Habecker
*Assistant Examiner*—James J. Groody
*Attorney, Agent, or Firm*—Edward H. Duffield

[57] ABSTRACT

An improved radio frequency transformer apparatus for detecting positional changes between a moving and a fixed element is disclosed. The system operates in the high frequency range (on the order of 5 megahertz) and utilizes a centered tapped pickup coil in conjunction with an elongated primary serpentine coil for detecting the null points in a signal which is inductively coupled to the pickup coil as it passes along the elongated serpentine transmitter coil or primary. The use of the null point as the sensing or trigger point simplifies the circuitry required and reduces the cost involved in building the position detecting transformer. The use of the high frequency signals reduces the size and complexity of circuits and circuit elements and enables the entire primary oscillator and detector amplifiers to be embodied in integrated circuit chips for positioning directly on circuit board apparatus. In addition, this design allows a fairly wide variation in spacing tolerance between the transmitter and the detector coils without inducing positional error indications between the moving and fixed elements. This further reduces the cost by lowering the precision required in constructing the device.

1 Claim, 15 Drawing Figures

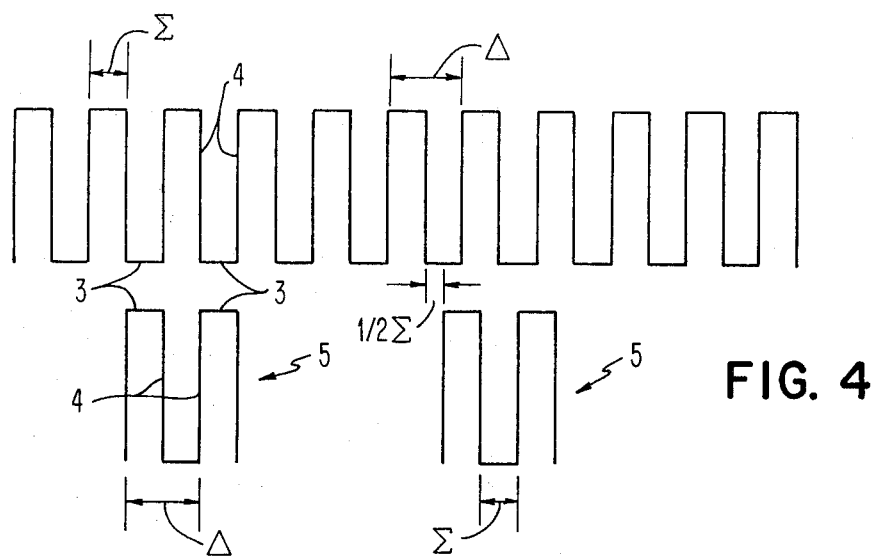
FIG. 4
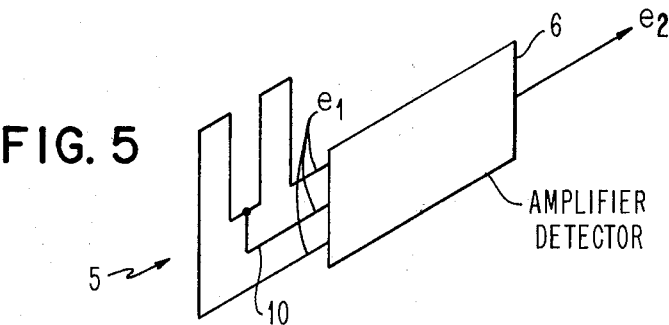
FIG. 5
FIG. 6
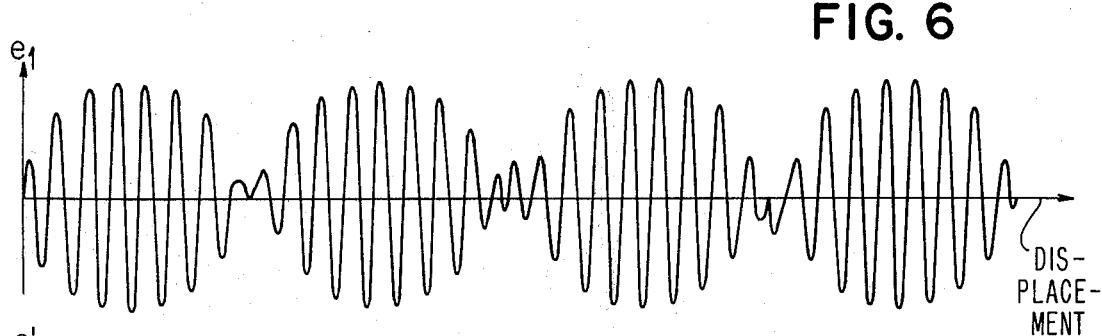
FIG. 9
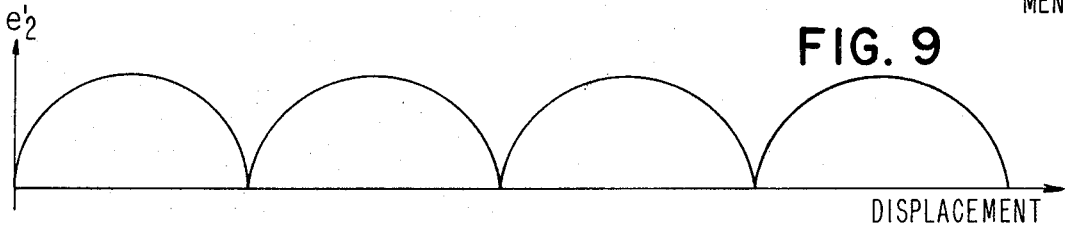
FIG. 7
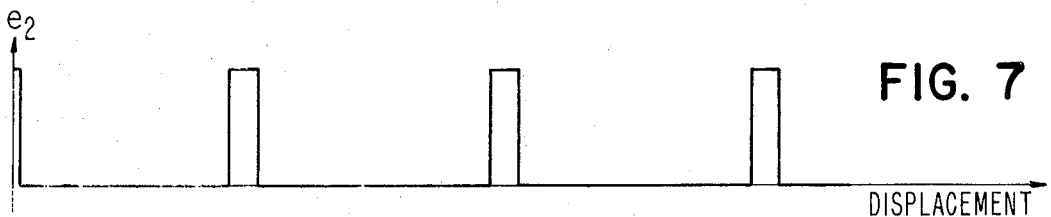

PATENTED AUG 5 1975  3,898,635
SHEET 6
PRIMARY
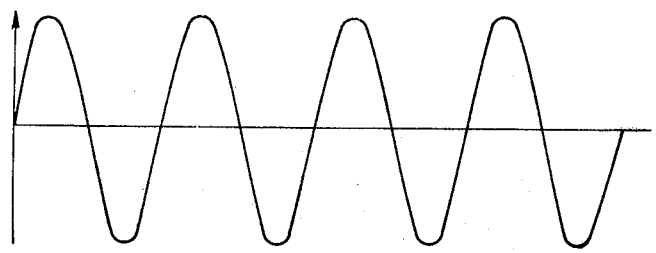
FIG. 8A
$e_1$
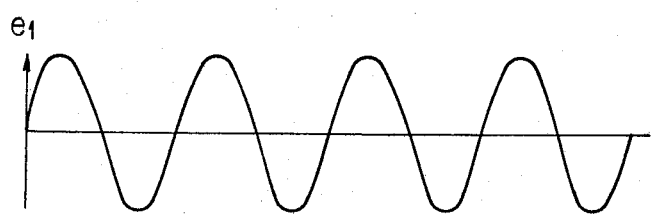
FIG. 8B
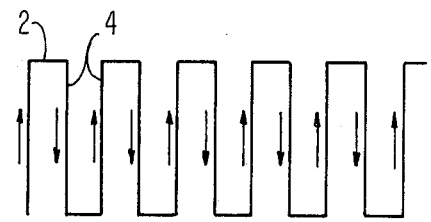
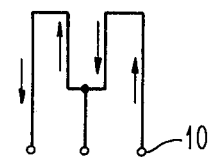
$e_1$
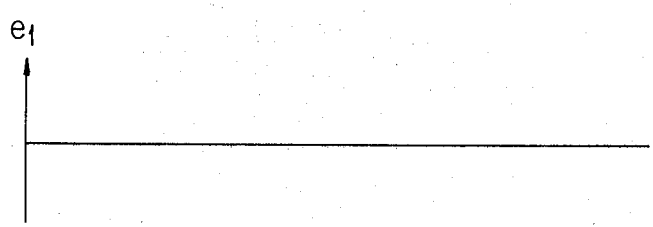
FIG. 8C
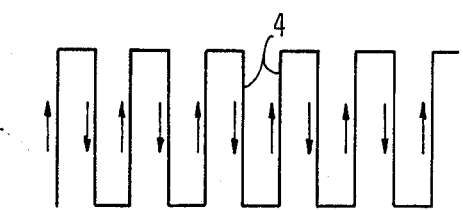
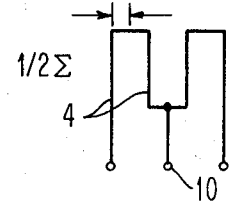
$e_1$
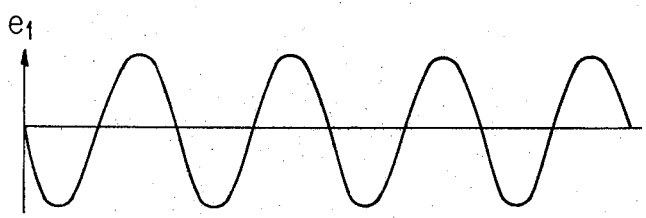
FIG. 8D
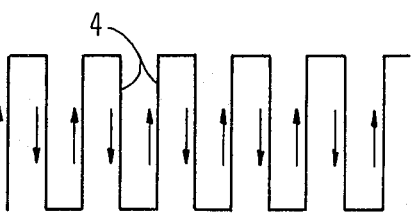
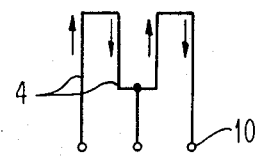

POSITION MEASURING TRANSFORMER

FIELD OF THE INVENTION

This invention relates generally to radio frequency inductive transformers utilized in position sensing apparatus, and specifically to high frequency (on the order of 1 to 10 megahertz) embodiments in which the detector amplifier utilizes a center tapped detector coil for sensing the null or zero crossing points in the induced signal.

PRIOR ART

A number of patents have been obtained in the past on basic radio frequency inductive position sensing devices and apparatus. Numerous improvements in various areas of the circuitry and arrangement of the various parts in the apparatus have been patented as well. Examples of the prolific prior art are U.S. Pat. Nos. 3,086,151, 3,090,934, 2,915,721, 3,064,218, 3,673,584, 2,942,212, 2,924,768, 3,551,649, 2,924,798, 2,799,835, 2,849,668, 3,176,241, 3,441,888, 2,650,352, and 2,836,803. All of the foregoing patents are related generally to inductive position sensing transformers of the radio frequency type and show improvements in a variety of areas related generally to increasing the resolution of the devices, reducing the effects of stray inductive fields and spurious signals, and in applying such position sensing transformers to control systems, etc.

What is apparently a common feature in the prior applications in this field is that very precise dimensional control over the formation of the primary coil and the secondary, or pick-off coil, as well as in their precise spacing relative to one another have been required. These factors have become important because variations in the placement between the transmitting coil or primary and the pick-off secondary coil can cause, as will appear later, variations in the received or sensed signal which generate errors in the position detection apparatus which cannot be tolerated.

Similarly, the previous attempts in solving the various problems inherent in radio frequency inductive devices of this type have required, or have utilized by preference, the maxima in the induced signals detected as the indicative portion of the signal. This choice has, in turn, required that carefully constructed maximum amplitude detecting devices be constructed to specfically identify in time and position the occurrence of the maximum voltage signal. Such circuits are generally more complex and expensive than is desirable.

In precision applications, to which most of the prior art is directed, the added expense of high tolerances and close constraints on physical construction cna be tolerated because the systems are generally intended for use in machine tools or other high capital investment devices which can bear the added cost to produce the requisite precision. The previous devices have not, however, been easily adaptable to low tolerance, small size and generally low cost embodiments because of the errors introduced by the various effects of variable spacing between the primary and secondary and by induced fields in the background or similar problems as many of the aforementioned patents clearly illustrate.

The aforementioned problems generally grow more severe as the frequency of the excitation applied to the primary increases. In the high frequency range of 10 megahertz in general, the prior art either has not ventured because of significant technical problems encountered as noted above, or has not ventured because of the technical problems associated with detecting the maxima in the signal strength at these high frequencies.

OBJECTS OF THE INVENTION

It is an object of the present invention to provide an improved radio frequency position detecting transformer apparatus in which the effects of the background induced signals from the primary are overcome in a new and improved manner.

It is a further object of this invention to provide an improved radio frequecny position sensing apparatus in which the null or zero crossing points in the induced signal are utilized rather than the maximum points.

It is still further an object of this invention to provide an improved radio frequency position detecting apparatus in which physical tolerances between the transmitter and the pick-up coils is not as critical or as demanding as previously known.

SUMMARY OF THE INVENTION

The aforementioned objects and others are met in the present invention by utilizing firstly a high frequency oscillator, operating generally in the range of 1 to 10 meaghertz, which radiates to a center tapped secondary or pick-off coil which is connected to an amplifier detector which detects the null or zero crossing points in the induced signal.

BRIEF DESCRIPTION OF THE DRAWINGS

FIG. 4 illustrates in a schematic form the relative positions between a theoretical primary coil and a secondary pick-off coil in two different orientations in which the maximum and minimum signal will be coupled by inductive coupling between the two coils.

FIG. 5 illustrates in schematic form the generalized circuitry of the present invention.

FIG. 6 illustrates the amplitude modulation signal envelope detected by circuitry such as that shown in FIG. 5.

FIG. 7 illustrates the location of the zero crossing or null points from the signal in FIG. 6.

FIGS. 8A through 8D illustrate the RF signal utilized in the primary coil of the present invention and the signals induced in the secondary coil as a function of the position relative to one another of the two coils.

FIG. 9 shows a rectified output signal from the amplifier detector.

Turning to FIG. 1, a general embodiment typical of the prior art is illustrated in which a radio frequency oscillator 1, operating generally in the range of 1 to 100 kilohertz, is connected to a primay coil 2 comprising a plurality of serpentine loops 3. Individual loop 3 are generally spaced apart in an even spacing, illustrated generally as distance $\Delta$, and the individual conductors 4 making up each loop 3 are generally spaced apart by some constant factor, $\Sigma$. The primary coil 2 is generally mounted on some sort of a backing member, which may be either flat and elongated or cylindrical as shown in the prior art, and the secondary coil 5 is mounted on a matching and parallelly spaced member which may either be the fixed or movable member. The secondary coil 5 comprises similar individual loops 3 made up of indivudual conductors or pieces 4 in which an induced signal $e_1$ is generated depending on the relative linear position between the primary coil 2 and the secondary coil 5. A generalized amplifier and detector 6 receives the input of signal $e_1$ and provides an amplified output signal $e_2$ as shown.

In the prior art, such as alluded to earlier with regard to various known patents, a variety of problems related to the construction of devices of the type shown in FIG. 1 have been identified and, in part, solved. FIG. 2 illustrates in graphical form a typical signal which would be produced at the output of an amplifier 6 in response to a high frequency input on the order of 1 to 10 merahertz from oscillator 1 into primary loop 2 of a device such as that illustrated in FIG. 1, when that signal is induced into pick-up coil 5 as shown.

In FIG. 2, signal envelope $e_1$, as induced in pickup coil 5 and applied to the input of amplifier 6 is shown in the vertical direction as a function of horizontal position of pick-up coil 5 relative to primary coil 2. As pick-up coil 5 is moved, assuming it is placed on the movable element of the position detecting system, the signal envelope such as that illustrated is generated by induced current in pick-up coil 2. As will be noted later, with reference to FIG. 4, various maxima and minima occur at some spacing which is dependent on the spacing delta between the individual loops 3 of the coils 2 and 5. It will be noted in FIG. 2, that the maximum amplitude occurs at a precise increment of space equal to delta, while the minimum points, identified generally as 7, do not occur at a regular spacing interval due to the variations in amplitude strength as a function of the position of the coils 5 and 2, the reason for which will become apparent later.

In FIG. 3, the typical output of amplifier 6 as signal $e_2$ is shown in a plot of amplitude versus displacement between coils 2 and 3. It is assumed that amplifier 6 is one of the typical types known in the prior art which detects the maximum amplitude in each portion of the signal envelope and produces an amplified single pulse at that point in time at which it detects the maximum as shown in FIG. 3 with typical pulse outputs 8. It will be noted that the spacing of these pulses 8 is approximately equal, and in theory should be precisely equal, to the spacing delta between adjacent loops 3 of the primary and secondary coils 2 and 5 respectively. Super-imposed on FIG. 3, and shown in dotted lines, are the relative locations of the minima or null points in the signal envelope of FIG. 2 which might be detected by a suitably constructed dectector amplifier utilized to trigger or detect the zero crossing points in the signal. These signal outputs which would be produced are illustrated generally as 9 in FIG. 3. It will be noted that the spacing of signals 9 as a function of displacement is irregular and corresponds to the zero crossing points 7 illustrated in FIG. 2.

Turning to FIG. 4, a schematic diagram of two positions between a primary coil 2 and a secondary or pick-up coil 5 is illustrated. In the first position, position A, pick-up coil 5 is shown with its individual loops 3 precisely aligned with opposing loops 3 of primary coil 2. It should be understood in the schematic of FIG. 4 that pick-up coil 5 would generally be placed in an overlying relationship with transmitting coil 2 as is more clearly shown in FIG. 1 so that the full length of individual conductor 4 may be brought into inductive coupling relationship with each other as is generally understood in the prior art. Position A is the position at which maximum coupling between coils 2 and 5 exists and the maximum signal as illustrated by the locations of the maxima 8 in FIG. 3 is induced into pick-up coil 5. This relationship is true each time the individual loops 3 are in alignment between coils 2 and 5. In position B, with the coil 5 displaced from coil 2 by an amount equal to one-half sigma, the minimum signal 9 in FIG. 3 would be produced at point 7 as shown in FIG. 2, because the minimal amount of coupling is present, as is wellknown in the art. In the theoretical sense, zero energy is transferred with the coils positioned as shown at position B. However, returning to FIG. 2, it will be noted that the signal envelope does not actually go to zero at point 7 corresponding to various positions B of FIG. 4. This is due to a variety of factors, notably the build-up of a general background field of radiation which is emitted from primary coil 2 and which is picked up by pick-up coil 5 virtually independent of its particular displacement position with relationship to coil 2. The background field is responsible for re-enforcing the pick-up signal at positions A and producing the large amplitude portions of signal $e_1$ shown in FIG. 2. The background field also detracts from the signal at alternate positions A, as will be readily apparent to those skilled in the art, so that the signal envelope is of smaller size in the alternate position shown in FIG. 2. This inherent problem grows worse with increasing separation physically between coils 2 and 5 in planes parallel to one another, and has resulted in the prior art's numerous attempts at reducing the gap or spacing between the coils and even in some instances providing additional shields or grounding elements to try to block out the background field. The problem grows worse as a function of increasing frequency, as will be readily appreciated by those skilled in the art.

Figure 1:
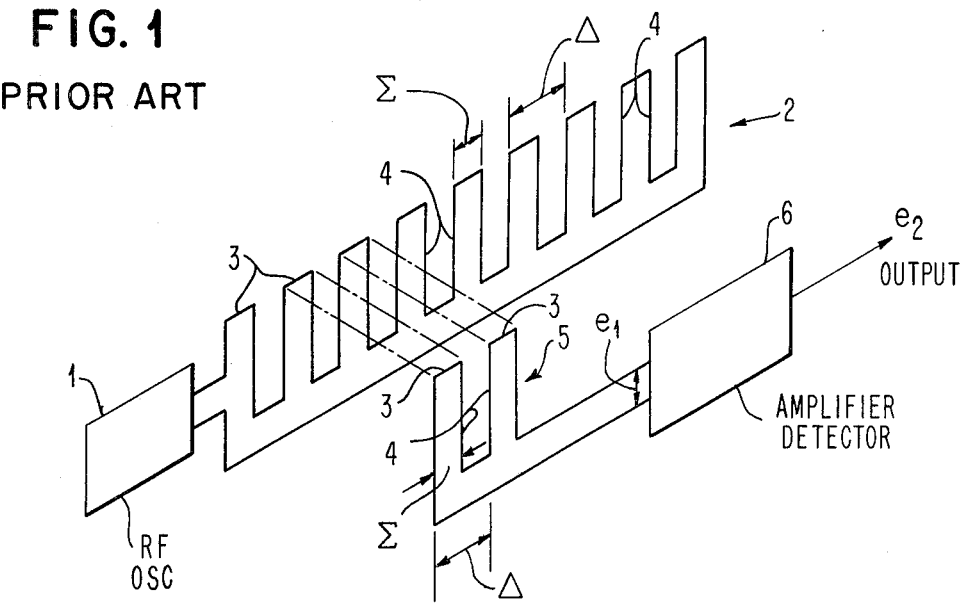
FIG. 1 illustrates in schematic form a general embodiment of the prior art.
Figure 2:
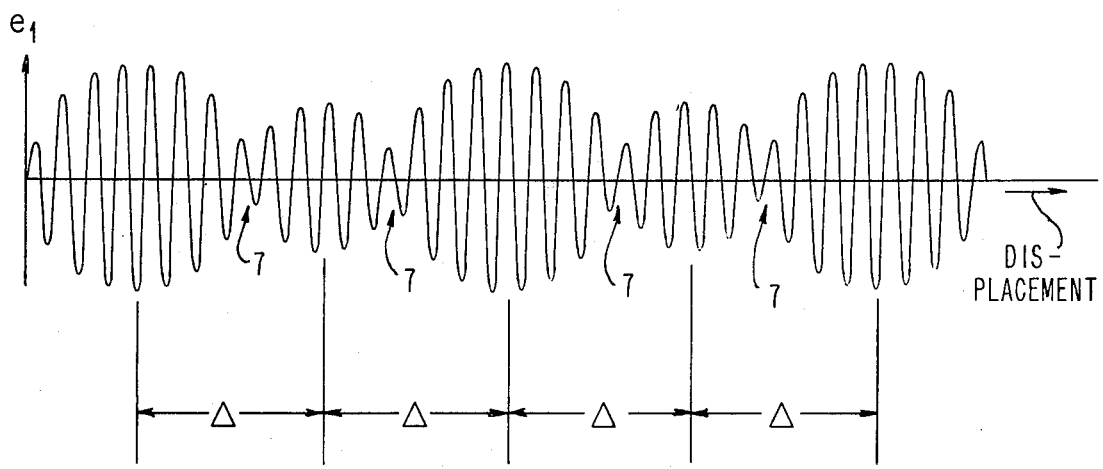
FIG. 2 illustrates in graphical form a typical signal which would be detected in the amplifier detector if high frequency on the order of 5 megahertz was utilized in the primary and detected in the secondary of the prior art circuitry illustrated in FIG. 1 when relative motion occurs between the primary and secondary.
Figure 3:
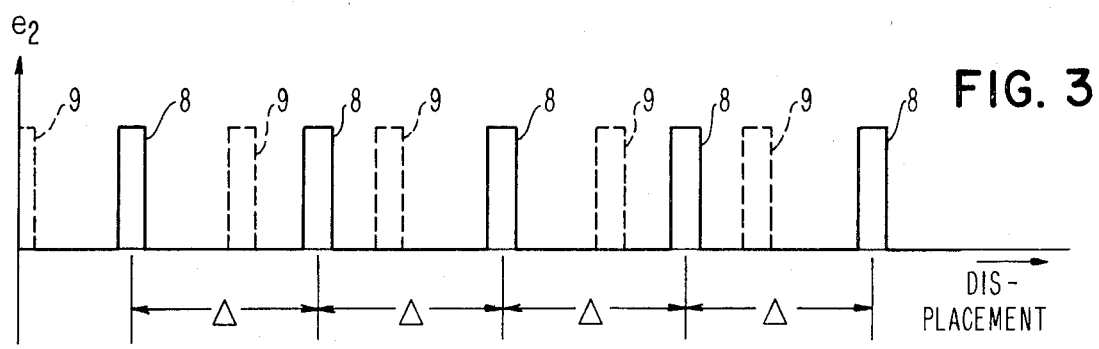
FIG. 3 graphically illustrates the location in position along the length of the primary coil at which null or zero crossing points would be observed by the circuitry of FIG. 1 in the amplitude modulation envelope of the induced secondary signal and also shows the points at which the maxima occurs.

Increasing the frequency at which oscillator 1 operates to the order of 1 to 10 megahertz can, however, reduce the separation tolerance between coils 2 and 5 which must be satisfied since an adequate signal for sensing can be coupled more effectively at the higher frequencies with an air gap medium. However, this increased allowance of spacing between the coils also increases the amount of background field which is coupled into coil 5 and enhances the alternate reinforcement and detraction of the induced signal $e_1$ as shown in FIG. 2.

Turning now to FIG. 5, an embodiment of the present invention will be described which alleviates the aforementioned short-comings with the prior art and which simultaneously permits both a relaxation in the careful spacing between coil 2 and 5 and which reduces or nullifies the effect of the background field on the induced signal $e_1$ shown in FIG. 2.

In FIG. 5, amplifier - detector 6 is connected to coil 5 in the usual manner, but an additional connection, center tap 10, is connected to coil 5 and to amplifier 6 at RF ground potential. The addition of center tap 10 produces an entirely different and unexpected result when it is connected to the RF ground of RF oscillator 1. The effect of the background field on induced signal $e_1$ disappears as is illustrated in FIG. 6 and regularly spaced signal envelope elements of approximately equal maximum and minimum amplitude are produced as shown in FIG. 6 with an actual null or zero crossing intermediate each of the maximum points. As illustrated in FIG. 7, the output of amplifier 6 at the null point, if amplifier 6 is built as contemplated to trigger or sense the null or zero voltage condition of the signal envelope of $e_1$, is as shown in FIG. 7. A regularly spaced pattern of pulses corresponding to the zero crossing, instead of the previously achieved irregular spacing, is produced when the zero crossing or minimum signal level is chosen as the triggering point for the detector amplifier 6.

This improved effect is achieved where the spacing between coil 5 and primary coil 2 is approximately one-half delta; typically a spacing of 40% of delta provides the best resilution of signal for the signal envelope $e_1$. Further improvement is provided by mounting a conductive shield on the back of the circuit board on which coil 2 is mounted and connecting the shiled to RF ground since this aids in reducing serious background fields being propagated out into the device or, since high frequencies are in use, to prevent stray high frequency radiation from reaching a human operator who may be standing or sitting near a machine incorporating such a position detecting device.

FIGS. 8A through 8D illustrate in graphical form the various signals as a function of displacement between coil 5 and coil 2 with a particular primary input signal as illustrated in FIG. 8A. In FIG. 8B, the signal as induced in coil 5 when the coil is positioned with the conductive elements 4 of coils 5 and 2 in alignment is shown. In FIG. 8C, the signal $e_1$ in coil 5 is shown for the position in which coil 5 is displaced by a distance one-half sigma from coil 2. As shown, the signal level goes to zero at this position when center tap 10 is connected to the RF ground represented by the horizontal axis in FIG. 8A. In FIG. 8D, the waveform for $e_1$ is shown when the pick-up coil 5 has been moved one space delta from its starting position shown in FIG. 8A. As can be clearly seen from the direction arrows representing the instantaneous flow of current in coil 2 (which will match the induced flow of current in coil 5) there is a 180° phase reversal which takes place between moving the coil from figured position 8B to FIG. 8D so that the amplitude modulation signal level must pass through 0 instead of varying between some maximum and some minimum level as previously indicated for the prior art in FIG. 2. An improved and better defined zero crossing of the signal is thus produced and this, in conjunction with the equal amplitude wave form as shown in FIG. 6 which is produced by utilizing center tap 10, contributes markedly to accuracy and overall performance of the position detecting device constructed in this manner. To further enhance the zero crossing effect, the amplified signal $e_2$ is also rectified and filtered to become $e_2'$. The cusps between major signal variations of $e_2'$ clearly define the zero crossing point, as will be appreciated by those familiar therewith. By utilizing the null point of the amplitude modulation envelope of FIG. 9, which corresponds to that of FIG. 6 and produces the final output as shown in FIG. 7 the accuracy is greatly enhanced.

The reason for this can be seen in FIGS. 9 and 8 where the important characteristic of the detected signal $e_2$ is its sharp notch at the null point. Except for any small noise pick-up from the ambient environment, the amplitude modulation signal actually goes through zero at this point for the reasons deliniated in FIGS. 8A through 8D. A further advantage which results from this type of approach with the center tap 10 connected to RF ground is that the relative position between primary coil 2 and secondary coil 5 when the final output occurs is not as sensitive to the gap between primary and secondary coils as prior art systems have been. The reason for this decreased sensitivity to the gap spacing is that higher frequencies couple more effectively, as was previously pointed out, and that the highly improved resolution by using the null point or a zero crossing is very precise in detecting the relative position between the primary and the secondary as they are moved relative to one another.

A further advantage of this particular embodiment is that both the primary and secondary coils can be placed simply on printed circuit boards or cards due to the fact that closely controlled spacing tolerances are not required. The somewhat uneven surface of the printed circuit cards can be utilized in spite of its unevenness. Also, the primary oscillator 1 and the amplifier detector circuit 6 can be located on the same cards with the primary and secondary coils since the amplifiers and detectors for high frequency signals in order of 1 to 10 megahertz as utilized in the present embodiment can be easily built in the form of integrated circuit chips which are small and light in weight.

Figure 10:
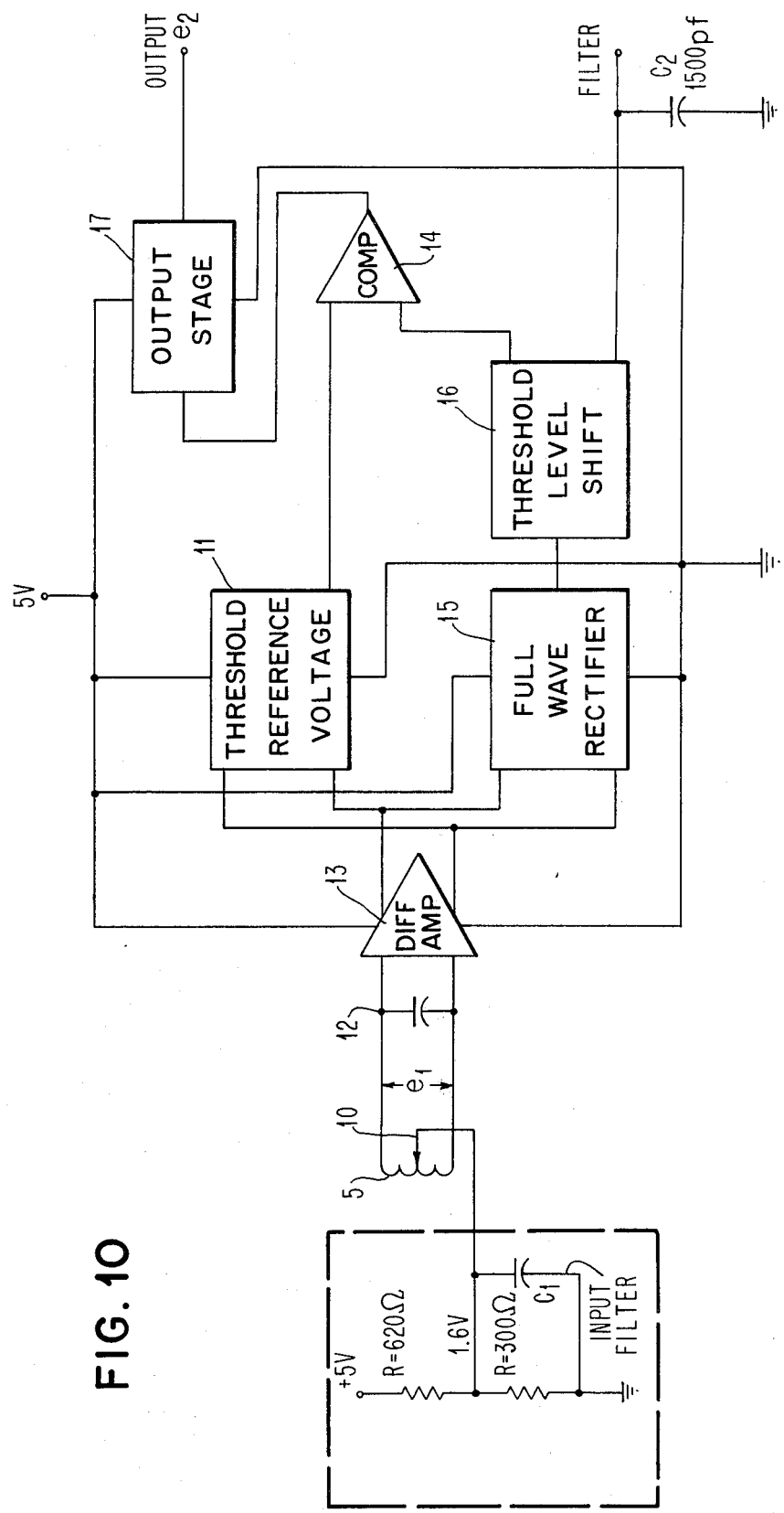
FIG. 10 shows a schematic diagram of the functional and logical layout of the detector amplifier utilized in the present invention.

Continuing now with the detailed specification for the embodiment illustrated, FIG. 10 shows in block schematic form a preferred embodiment of amplifier 6 which also serves as a signal detector. The input in amplifier 6 is from moving pickup coil 5 which is tuned to peak a double side-band suppressed amplitude modulated primary input signal at approximately 4.3 megahertz. Coil 5 is tuned with a 1500 picofarad capacitor C1 to achieve 450 millivolts peak to peak maximum signal amplitude plus or minus 20%. Capacitor C1 is mounted on the same circuit card as the integrated circuit chip which comprises the remainder of amplifier 6 as will appear later. As noted previously, the amplitude modulation induced into the input signal is a function of pick-up coil 5 position relative to coil 2. It is also a function of the pick-up coil 5's velocity. In amplifier and detector 6, when the differential input signal is below a set input threshold chosen at approximately 30 millivolts peak to peak and set by a threshold reference voltage section 11 of amplifier 6, the final output $e_2$ is "off" or at a down level, otherwise the circuit is set to operate at an up or "on" level of approximately 5 volts. A more detailed description of the circuitry of amplifier 6 is shown in a specific embodiment illustrated schematically in FIG. 11.

Figure 11:
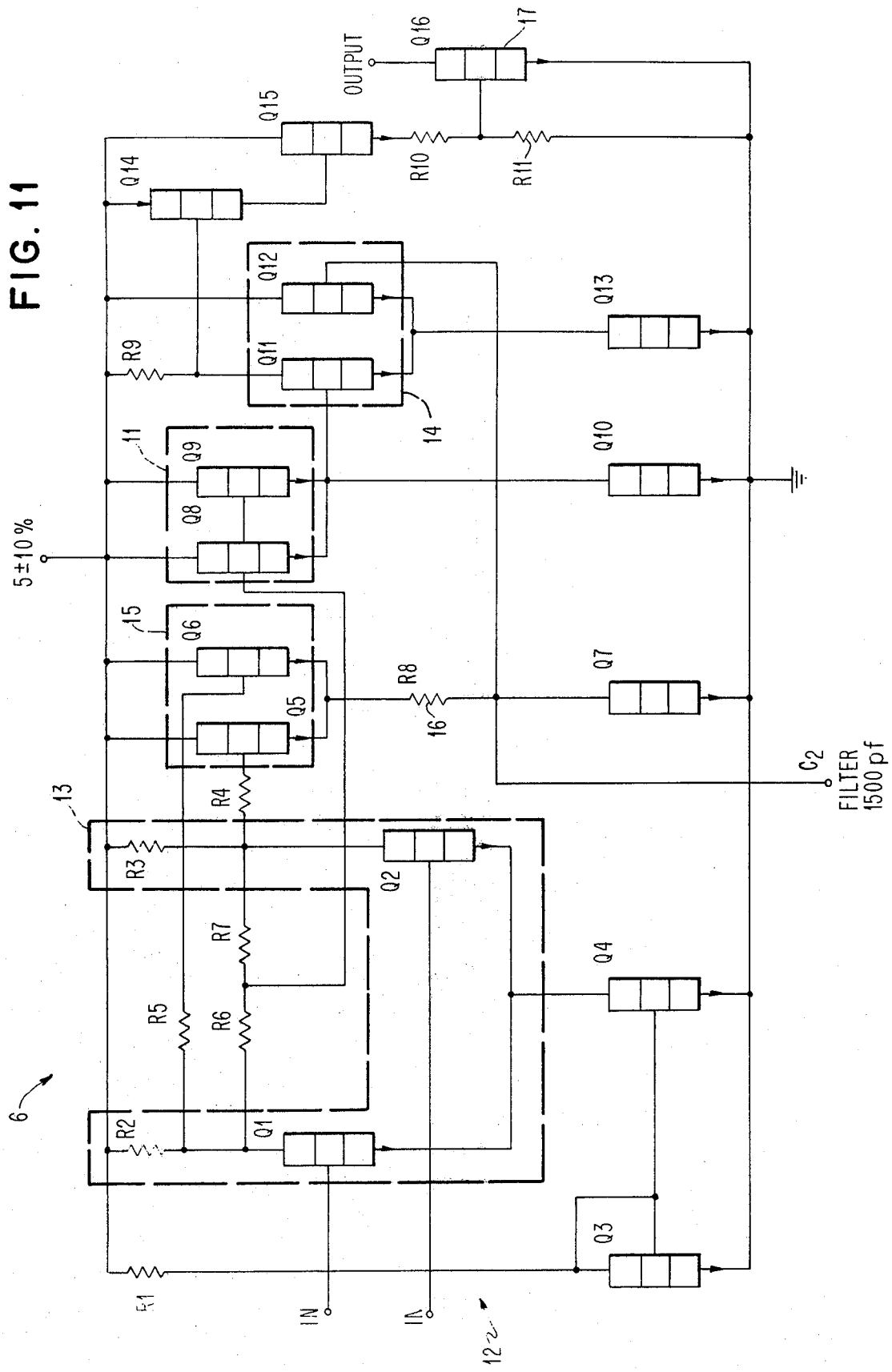
FIG. 11 illustrates a specific circuit embodying the general function set forth in FIG. 9.

As shown in FIG. 11, the tuned input from coils 5 is applied to input 12 where it is applied to the input of differential amplifier 13 which has a nominal single end voltage gain of 17. Amplifier 13 consists of transistors Q1 and Q2 with load resistors R2 and R3.

Threshold reference 11 is comprised of resistors R6 and R7 which form a voltage divider network. The voltage at the junction of R6 and R7 is a constant DC voltage regardless of the input to the differential amplifier 13 and the voltage is dropped to a lower level by the drain from the base-emitter junctions of transistors Q8 and Q9. The voltage at the emitters of Q8 and Q9 is the threshold reference voltage which is applied to one input of comparator 14 at the base of transistor Q11.

The voltage at the emitters of transistors Q5 and Q6 is equal to the full wave rectification of the differential signal applied to the bases of these transistors plus a constant DC voltage which is fixed regardless of whether or not any input is present. By adding resistor R4 and R5 to the series with the bases of transistors Q5 and Q6 the DC voltage which is added to the full wave rectification signal is made equal to the voltage threshold reference signal coming from threshold reference voltage portion 11.

The output of the full wave rectifier 15, comprising transistors Q5 and Q6 as previously stated, is negatively shifted by approximately 0.11 volts due to the voltage drop cross resistor R8. This shifted signal voltage is applied to another differential comparator comprising transistor Q12 where the input is applied at its base, and the signal is also applied by the external 1,500 picofarad capacitor used to filter out the RF components which may still be present. The differential comparator 14 comprises transistors Q11 and Q12 which have base inputs as comparator inputs. When Q11 is on, so are transistors Q14, Q15, and Q16, with Q's 14 and 15 forming the equivalent of a high beta PNP transistor, while the resistive voltage divider R10 and R11 provide the proper drive level for the output transistor switch Q16 in the output stage 17.

The overall operation of the circuitry illustrated in FIG. 10 schematically, and more particularly in FIG. 11, is as follows. The input signal $e_1$ is generated from center tap pick-up coil 5 where the tap 10 is connected to a 1.6 volt DC reference level as RF ground. This voltage is generated by a voltage divider network connected to a 5 volt DC power supply where R1 is 620 ohms and R2 is 300 ohms. When no signal is applied, the base of transistor Q11 is 0.11 volts more negative than the base of transistor Q11. Therefore, transistors Q11, 14, 15, and 16 will be in the "on" condition. The signal input required to barely switch on the comparator 14 will increase the voltage at the full wave rectifier output 15 by 0.11 volts so that the bases of transistors Q11 and Q12 are at the same voltage, therefore turning Q14 in the "off" state.

The circuitry illustrated in FIG. 11 is preferably embodied in an integrated circuit chip, but could be just as easily built of discrete components as will be appreciated by those skilled in the art. Similarly, too, a variety of similar detecting and amplifying embodiments for the amplifier detector 6 could be built as is well-known in the art to function as well as the present embodiment provided a center tap 10 is maintained at the RF ground potential as taught.

Figure 12:
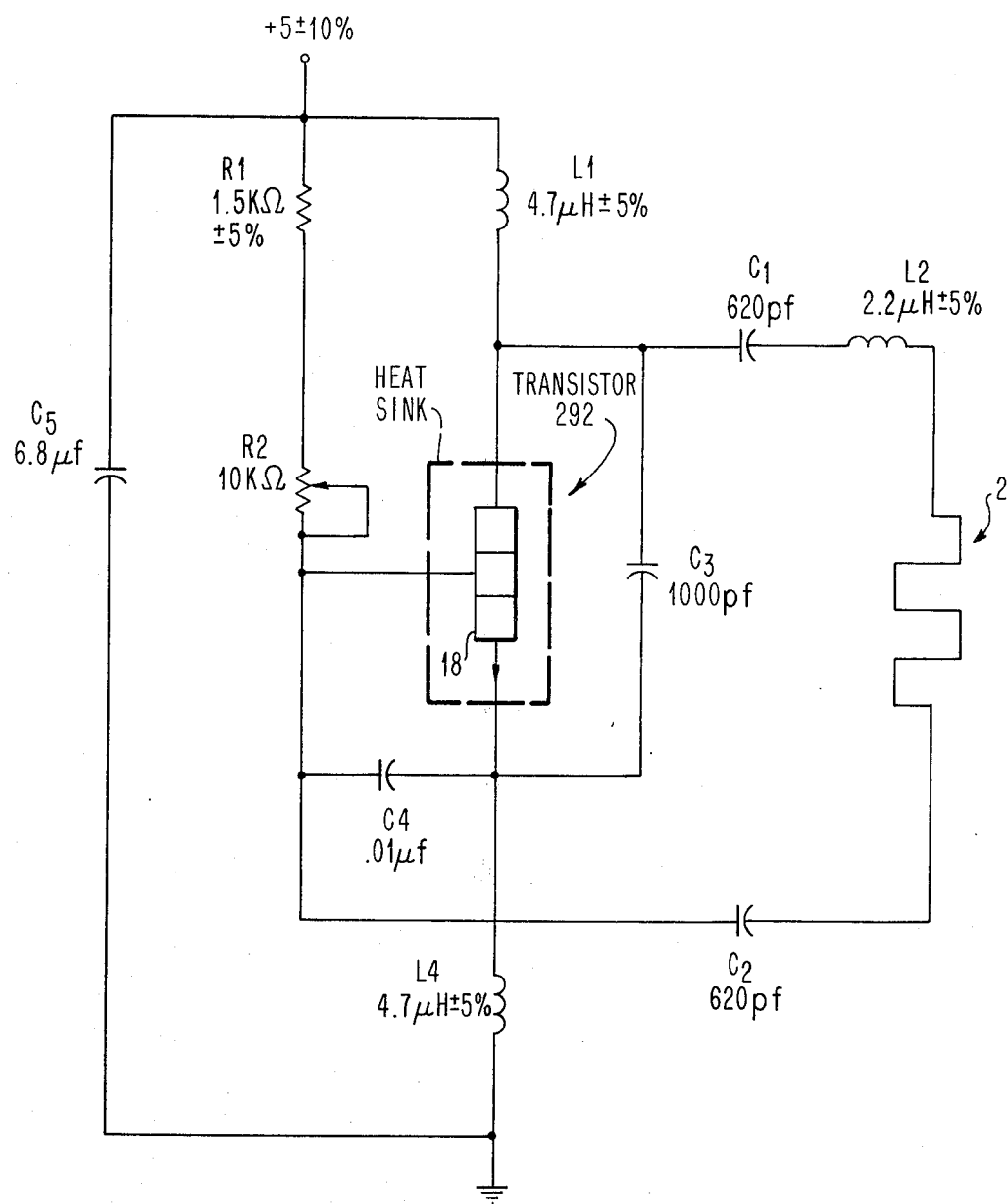
FIG. 12 shows a typical high frequency oscillator as utilized in the present invention.

Turning to FIG. 12, an embodiment of primary oscillator 1 is illustrated whose purpose is to generate a sine wave output at approximately 4.3 megahertz plus or minus 8%. The capacitors C1 through C4 and inductor L2 together with the linear emitter (which is actually the primary coil 2) form a resonant circuit. Coil 2 is designed to have an impedance equal to $120/82 \pm 10\%$ at 4.3 megahertz. Transistor 18 has a bias current that is controlled by resistor R2 as illustrated and the transistor is the type 292 commercially available. Other circuit elements and values are as shown and it will be readily appreciated by those in the art that what is shown is a typical Clapp oscillator. C4 is the feedback capacitor and coil 2 is the inductance which is placed on the primary coil circuit board. Inductor L2 is a discrete inductance added to improve the L to C ratio of the tuned resonant circuit and has an inductance of approximately 2.2 micro henries. Resistors R1 and R2 are set for the bias level of the transistor 18 to operate in class A amplification. These requirements can be realized in a variety of other similar circuitries easily constructed by those skilled in the art and this brief definition of the requirements and of one embodiment should suffice to make clear the preferred method of constructing the same.

This particular embodiment of position detecting device operating on induced RF current has been found to be a particularly advantageous one in that it overcomes the problems alluded to earlier in the specification. It is also capable of being embodied in small lightweight components which fit easily on the circuit board substrates on which can be mounted the particular primary and secondary coils illustrated without undue delaterious effects from the uneven surface which is characteristic of the circuit boards. It will be readily appreciated that the circuitry involved is quite inexpensive and that the overall construction and details of this embodiment can be realized at very low cost with simple and non-critical installation which does not require the high precision tolerances of previous RF position sensing devices. The particular position detector has been found to be a particularly advantageous one for use in moving head printer devices where a print head traverses a platen and it is desired to known quite accurately where the print head is at each incremental point of its travel along its path.

While the invention has been particularly shown and described with reference to a preferred embodiment thereof, it will be understood by those skilled in the art that various changes in form and details may be made therein without departing from the spirit and scope of the invention.

What is claimed is:

1. A position sensitive transformer device, comprising:
    a primary inductor means for radiating flux, said primary inductor means comprising a series of uniformly spaced and parallelly disposed electrical conductors, said conductors being connected together in a series circuit;
    a primary oscillator means for generating high frequency alternating current signals of varying potential relative to a ground potential, said primary oscillator means being connected in parallel with said primary inductor means to complete an electrical circuit therewith;

a secondary inductor means for receiving said radiated flux from said primary inductor means, said secondary inductor means comprising a series of uniformly spaced and parallelly disposed electrical conductors, the spacing thereof being equal to the spacing of the conductors of said primary inductor means, said conductors being connected together in a series circuit and further having a center tap located at the mid point of said series connected array of electrical conductors; and a detector and amplifier means for detecting and amplifying electrical signals relative to the electrical ground of said oscillator means, which signals are induced in said secondary inductor means;

said detector and amplifier means being connected in parallel with said secondary inductor means to complete an electrical circuit therewith, and with said center tap being referenced to ground potential;

said detector and amplifier means further including means for detecting the zero potential level of said induced signals in said secondary inductor means at the amplitude modulated minima of said signals induced in said secondary inductor by the relative motion between said primary inductor means and said secondary inductor means;

said primary and secondary inductor means being mounted on adjacent surfaces and positioned parallel to one another and spaced apart by a distance less than said spacing between said conductors of said primary and said secondary inductor means, said primary and secondary inductor mounting surfaces further including means for producing relative movement between said surfaces in a direction of travel perpendicular to said parallelly disposed conductors of said primary and said secondary inductors mounted thereon and parallel to said surfaces on which said inductors are mounted, thereby varying the induction between said primary and secondary inductors and creating an amplitude modulated induced signal in said secondary inductor means during movement thereof relative to said primary inductor means.

* * * * *